Figure 1:
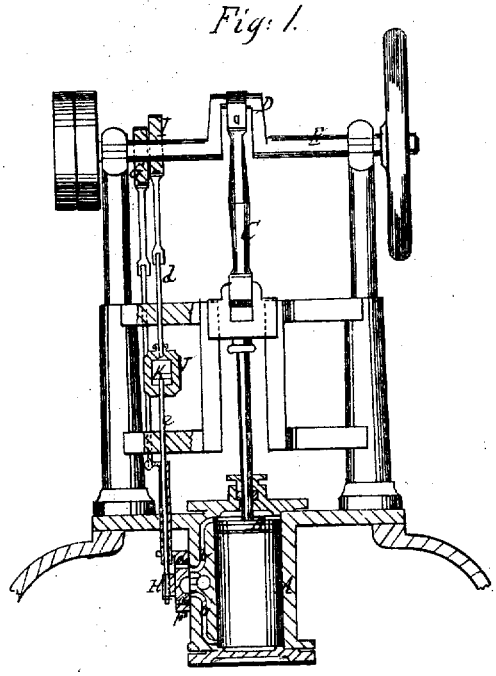

William Baxter.

Steam-Engine-Valve Device.

No. 3,364. Reissued April 13, 1869.

Witnesses:

E. F. Kastenhuber

Chas. Wahler

Inventor:

Wm. Baxter per

Van Santwoods & Hauff

Attys

UNITED STATES PATENT OFFICE.

WILLIAM BAXTER, OF NEWARK, NEW JERSEY.

IMPROVEMENT IN STEAM-ENGINE-VALVE DEVICES.

*Specification forming part of Letters Patent No.* 83,444, *dated October* 27, 1868; *reissue No.* 3,364, *dated April* 13, 1869.

*To all whom it may concern:*

Be it known that I, WILLIAM BAXTER, of Newark, in the county of Essex and State of New Jersey, have invented a new and Improved Self-Compensating Steam-Valve; and I hereby declare the following to be a full, clear, and exact description thereof, which will enable those skilled in the art to make and use the same, reference being had to the accompanying drawing, forming part of this specification.

This invention consists in controlling the throw of a steam-valve, by interposing between the moving-cam and the valve a resisting medium, the action of which on the valve increases and decreases according to the speed of the engine, in such a manner that the speed of the engine is regulated by the valve itself, and without the use of a governor or other device of a similar nature.

It consists, further, in the arrangement of a plunger and barrel filled with liquid, and provided with a channel connecting its ends, said barrel being placed between the cut-off valve of an engine and the cam or crank shaft, in such a manner that by the resistance of the liquid the throw of the cut-off valve is regulated automatically, according to the speed of the engine, and that said cut-off valve takes the place of the governor.

It consists, further, in the arrangement of a regulating-valve in the channel, which connects the ends of the barrel in such a manner that the effect of the resisting liquid can be adjusted according to the speed of the engine desired.

It consists, further, of the combination with a steam-cylinder within the boiler, or in a steam-chamber connected with said boiler, of an uncovered or open valve, also located within the boiler or steam-chamber, and sliding on open steam admission ports, so that the steam which surrounds both cylinder and valve shall directly enter the cylinder at the pressure and temperature existing in the boiler.

It consists, further, in the arrangement of the cut-off-valve rod and the main valve-rod, so that the one shall pass through the other; or, in other words, so that both shall have a common axis for the purpose hereinafter specified.

It consists, finally, in the arrangement of a portable engine built upon the flange of the steam-cylinder, which forms the bed-plate of the engine, and covers the top of the boiler, so that the valves, connections, and other parts may be adjusted before the engine is placed upon the boiler without being liable to variation or derangement by reason of the expansion or contraction of the boiler, and so that the whole may be bodily applied to or removed from the boiler with ease and dispatch.

To enable those skilled in the art to understand and use my invention, I will now proceed to describe the manner in which my invention is or may be carried into effect, by reference to the accompanying drawings, in which—

Figure 2:
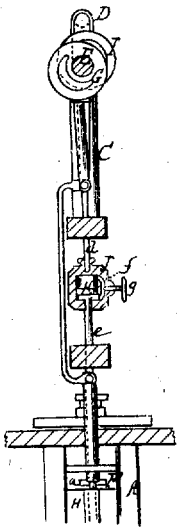

Figure 1 represents a sectional front view of this invention. Fig. 2 is a sectional side elevation thereof.

Similar letters indicate corresponding parts.

A represents a steam-cylinder, provided with a piston, B, which connects by a rod, C, with the crank D of the shaft E, in the usual manner.

The steam-cylinder is located within the boiler, or in a steam-chamber connected therewith, as shown and described in Letters Patent No. 83,445, granted to myself, and receives steam at the pressure and temperature which exist in the boiler.

Owing to the above-specified arrangement of the steam-cylinder, the valve and steam-admission ports need not be inclosed within the chest ordinarily employed for the purpose, but the steam is allowed to enter directly from the boiler through the uncovered valve and admission-ports into the cylinder, thus effecting a saving of fuel and preventing the steam from being wire-drawn.

The valve is held in place against its seat by the pressure of the steam which surrounds it, and without the aid of solid or skeleton covers, plates, or other mechanical devices usually employed for this purpose, and thus the valve is left wholly open and uncovered, the construction of the valve-device is simplified, the number of parts required to make the mechanism operative is reduced, and all the friction which necessarily arises between the valve and any mechanical device employed to press it against its seat is avoided.

The upper flange of the steam-cylinder, as will be seen by an inspection of the drawing, forms the cover for the top of the boiler and the bed-plate of the engine, which is built upon and directly attached to it. Under this arrangement the valves, rods, shaft, and all connections can be put in place and adjusted before the cylinder is applied to the boiler, and the whole constitutes a portable engine of exceedingly simple and compact construction, which can bodily be lifted from or adjusted upon the boiler with great ease and convenience, and is liable in none of its parts to be affected by the contraction or expansion of the boiler.

Between the cut-off valve H and its moving-cam is interposed a barrel, J, fixed to and moving with the rod *d*, which is connected with the cam, and containing a piston or plunger, K, attached to a rod, *e*, by which motion is communicated to the valve.

When the engine is in motion the cut-off valve remains stationary until the barrel J has moved far enough to strike the piston K, and then the cut-off valve moves and cuts off the steam at half-stroke, or any other portion of the stroke, according to the amount of play of the piston K in the barrel J.

In order to make the motion of the valve H self-compensating, according to the motion of the engine, I provide the barrel J with a channel, *f*, (see Fig. 2,) which connects its two ends; and if said barrel is filled with water, oil, or other liquid, the motion of the barrel causes this liquid to pass through the channel *f* from one side of the piston to the other.

By the action of the liquid, a certain resistance is produced, which opposes the motion of the barrel independent of its piston; but if the motion of the engine is slow, the power requisite to move the valve H is greater than the resistance produced by the liquid, and said liquid passes out through the channel *f*, without causing the piston K to move with the barrel J before said barrel strikes or comes in contact with the piston. When the speed of the engine increases, the resistance produced by the liquid increases also, and the piston K is caused to move with the barrel before said barrel comes in actual contact with it, and the steam is cut off at less than half-stroke; and finally, if the speed of the engine still further increases, the action will be the same as if the channel *f* were closed. The piston K will move with the barrel J, and the steam is cut off at the beginning of the stroke; or, in other words, no steam is permitted to enter the cylinder.

It is obvious that by increasing or decreasing the size of the channel *f* in the barrel J, the resistance produced by the liquid can be regulated to correspond to the required speed of the engine. This result is attained by means of a regulating-screw, *g*, which enters the side of the barrel J. (See Fig. 2.) By screwing this screw in, the channel *f* can be partially or wholly closed. Instead of the screw a valve of any desired description could be used.

From the foregoing description it will be perceived that by thus interposing between the valve or valves of the engine and the eccentric or cam, a resisting or governing medium which makes the valve self-compensating, or variable according to the variation of speed, and consequently to the variation of resistance, the necessity for the employment of all devices commonly known as governors or regulators is done away with. Instead of the change of speed acting first upon the governor, and from the governor back to the valve to rectify variations, as is ordinarily the case, this compensating-valve arrangement acts directly upon the engine, making the engine itself its own governor.

It is needless to state that this portion of my invention is applicable to steam-valves in general, and not only to the cut-off valve.

It will be seen by reference to Fig. 1 that the lower part of the main-valve rod is made tubular, so as to constitute a sleeve, or hollow bearing, through which the cut-off-valve rod *e* plays, the two rods having thus a common axis. By this arrangement the cut-off-valve rod is supported and steadied, and the cut-off valve is assured accurately in its position without the aid of other and complicated mechanism which would otherwise be necessary.

Having thus described my invention, and the manner in which the same is or may be carried into effect, what I claim, and desire to secure by Letters Patent, is—

1. The method herein described of controlling the throw of a steam-valve, by interposing between the moving-cam and the valve a resisting medium, the action of which on the valve increases or decreases in proportion to the speed of the engine, substantially as and for the purpose decribed.

2. The combination with the valve, and its moving-cam or eccentric, of the regulating-barrel and piston, interposed between said cam and valve, and connecting the divided valve-rod, substantially in the manner specified.

3. The regulating-piston and the barrel for containing the resisting medium, provided with a channel connecting its ends, with or without an adjusting or regulating valve, in combination with the valve and its moving-cam and connecting-rod, substantially as and for the purposes set forth.

4. The combination with the steam-cylinder, located within the boiler or steam space or chamber connected therewith, of a wholly uncovered or open valve, also located within said boiler or steam-chamber, sliding on open steam-admission ports, and held or pressed against the valve-seat by the pressure of steam alone, without the aid of any mechanical device applied for the purpose, substantially as set forth.

5. The arrangement herein shown and described of the cut-off-valve rod and main-valve rod, so that the one shall pass through the other, or so that both shall have a common axis, for the purposes set forth.

6. The arrangement of a portable engine, built upon the flange of the steam-cylinder, which at once forms the bed-plate of said engine and the cover of the boiler or steam-space connected therewith, substantially as herein described, whereby the whole may be bodily applied to or removed from the boiler, as set forth.

In testimony whereof I have signed my name to this specification before two subscribing witnesses.

WM. BAXTER.

Witnesses:
SAML. PITTS RUSSELL,
WM. D. RUSSELL.